United States Patent [19]

Stettner et al.

[11] Patent Number: 5,446,529
[45] Date of Patent: Aug. 29, 1995

[54] 3D IMAGING UNDERWATER LASER RADAR

[75] Inventors: Roger Stettner; Howard W. Bailey, both of Santa Barbara, Calif.

[73] Assignee: Advanced Scientific Concepts, Inc., Santa Barbara, Calif.

[21] Appl. No.: 15,627

[22] Filed: Feb. 9, 1993

Related U.S. Application Data

[63] Continuation-in-part of Ser. No. 856,019, Mar. 23, 1992 pending.

[51] Int. Cl.$^6$ ................................................ G01C 3/08
[52] U.S. Cl. ..................................... 356/4.01; 250/332
[58] Field of Search ............... 356/4, 5; 250/332, 330, 250/339

[56] References Cited

U.S. PATENT DOCUMENTS

| | | | |
|---|---|---|---|
| 3,815,994 | 6/1974 | Peckham | 356/4 |
| 3,937,574 | 2/1975 | Peckham et al. | 356/4 |
| 4,160,204 | 7/1979 | Holmgren et al. | 324/207 |
| 4,652,766 | 3/1987 | Wang et al. | 250/578 |
| 4,688,086 | 8/1987 | Hutchin | 358/95 |
| 4,854,698 | 8/1989 | Schmidt | 356/5 |
| 4,862,257 | 8/1989 | Ulich | 358/95 |
| 4,967,270 | 10/1990 | Ulich et al. | 358/95 |
| 5,091,778 | 2/1992 | Keeler | 358/95 |
| 5,101,108 | 3/1992 | Gaalema et al. | 250/332 |

Primary Examiner—Mark Hellner
Attorney, Agent, or Firm—Gottlieb, Rackman & Reisman

[57] ABSTRACT

A three dimensional imaging device and method is presented which uses a pulsed light source for detecting objects enveloped by a light-transmitting and light-reflecting and scattering medium such as water or biological tissues. By means of high-speed switching between many storage capacitors the third dimension is recorded by the device with a single pulse from the light-source. The device consists of the pulsed light source, optics for collecting the reflected and scattered light, one or more sensors for detecting the light, drive and output electronics for timing and signal conditioning of data generated by the sensors and processing electronics and software for converting the sensor data to a three dimensional image. The sensors use known technologies for light amplification but collect and process the light-amplified data in a unique manner, using an analog-processing readout chip. The readout chip is a two dimensional array of collectors or detectors combined in very close proximity with associated storage and switching electronics. The two dimensional array defines two dimensions of the image. The third dimension is associated with the time of return of the light pulse.

40 Claims, 11 Drawing Sheets

3D IMAGING UNDERWATER LASER RADAR

BACKGROUND OF THE INVENTION

This application is a continuation-in-part of application Ser. No. 856,019, entitled "Autoradiographic Digital Imager, filed Mar. 23, 1992 pending.

This invention relates to underwater laser radar vision apparatus capable of viewing from either above or below the water surface. In particular, it relates to electronic apparatus for capturing a three dimensional image of a target from reflected laser pulses.

Laser radars determine depth in a medium by measuring the time difference between the transmission and receipt of a pulse of light and dividing by twice the velocity of light in the medium. Depth resolution in such devices is related to the accuracy of this time difference measurement. At the same time, it is often desirable to image a large surveillance area at each depth. Examples of high-speed underwater viewing applications involving large surveillance areas are bottom, reef and harbor terrain mapping as well as fish school location and evaluation from an aircraft. Examples of underwater viewing where accuracy of object identification is more critical than large-area surveillance are underwater vision for divers and vision for underwater remotely piloted vehicles engaged in inspection and salvaging. Current underwater laser radar designs are limited by their area and depth coverage rate, by their spatial resolution, by their depth resolution, by the weight of their receiver and by the high receiver power necessary to operate the design.

One current underwater laser radar technology utilizes a system employing a single detector. That system requires a separate laser pulse for every pixel in the two dimensional area associated with each depth. J. Banic, S. Sizgorio, and R. O'Neil, "Airborne Scanning Lidar Bathymeter Measures Water Depth" SPIE Proceedings, Vol. 663. That system is severely limited in both area and volume coverage rate because lasers loose their efficiency at high pulse rates. For an $N \times N$ pixel array, at a single depth, the present invention could be as much as $N^2$ times faster. To achieve wider area coverage, laser radars employing a single detector use a mechanical two-dimensional scanner. This scanner is a drawback because of its additional weight, the problem of mechanical unreliability and the complexities of its attendant pixel-registration processing.

Some single-detector underwater laser radars combine the single pixel with a high-speed real-time digitizer to improve depth coverage. The slowness of the digitizer, however, limits the dynamic range of depth values that can be digitized. A laser return signal from deep underwater objects can be four or five orders of magnitude weaker than the return signal from near surface objects. Current real-time digitizers are not fast enough to convert analogue values over such a large range into digital values. A logarithmic depth scale is sometimes used to increase dynamic range but this results in an undesirable reduction of depth resolution. The small dynamic range of available digitizers means that only a limited depth can be explored by a single pulse in these devices. As a result, the field of this invention is characterized by requiring many laser radar pulses to scan both depth and area.

The limited dynamic range of current underwater laser radars is due in part to the use of real-time, high-speed digitizers to continuously digitize the return signal. The return signal which must be digitized is continuous due in part to water scattering light back into the receiver and attenuating the return signal approximately exponentially with depth. To further complicate matters, the time during which returns are possible is short (about a microsecond for light to travel from the water surface to the maximum depth and back to the receiver) and digitization of an analog signal is a complex process requiring that many operations be compressed into that short time. The requirement of high-speed digitization therefore requires high power and much supporting hardware. Thus, the single pixel real-time digitization scheme has limited application because of its relatively large weight, large volume and high-power requirements. A remotely piloted vehicle, for example, may run its motor and all other equipment on batteries and cannot afford sensors with large power requirements.

Attempts to use standard or modified two dimensional detector arrays to solve the area coverage problem of single detectors has not satisfactorily solved the depth resolution problem. Two dimensional detector arrays employing charge coupled devices (CCDs), have been proposed, in combination with gated microchannel plate image tubes, for underwater laser radar receivers. Barry A. Swartz, Laser range-gated underwater imaging including polarization discrimination, Pg. 42, SPIE Vol. 1537, Underwater Imaging, Photography and Visibility (1991). They are unsatisfactory for depth coverage because of the substantial time (milliseconds) required to read the information off the arrays. Only a single depth slice can be acquired with one laser pulse and one image tube. Depth resolution depends upon measuring differences in the arrival time of light in nanoseconds (ns) and more than one depth slice cannot be acquired by slow CCD detector array readouts. For example, it would be necessary to resolve arrival time to 5 ns, in order for the position of an underwater object to be resolved to 50 cm.

Two methods have been proposed to get around the detector-array slow-readout depth-resolution problem. The first method uses multiple CCD arrays with image tubes which are turned on or gated-on at different times. A drawback of this method is still the unwieldy number of detector arrays required to obtain acceptable depth coverage over the full depth range with one laser pulse. The method merely makes a compromise between the number of detector arrays and the number of laser pulses required for complete depth coverage. The maximum number of pulses are required for depth coverage in the limit of a single detector array. Because of the limitation in gating speed and the fact that only one two dimensional array of data is obtained for each laser pulse, a number of pulses is still required in the multiple gating-on image tube system for complete area and depth coverage. Aside from compromising on the number of pulses, the gating-on of multiple photo-cathodes is difficult to optimize for maximum depth penetration. Maximum penetration requires not only gating-on but also gating-off the image tubes in a short time consistent with the laser pulse length.

The failure of prior systems to optimize depth penetration is a serious matter. Depth penetration is limited for underwater laser radars even in the clearest water, and maximum depth penetration is needed for system flexibility. Penetration at best is only about 100 m–200 m and depends directly upon the return signal-to-noise ratio, which is maximized if the minimum number of extraneous photons are counted along with the object-reflected return photons. Extraneous photons, however, are always present from water backscatter and other light sources, particularly in daytime. The maximum signal-to-noise ratio is achieved if the photon integration time is the same as or smaller than the laser pulse interval (about 10 ns). It is difficult to gate the detector-array image tubes on and off in so short a time to achieve this level of signal-to-noise optimization. In addition, in prior systems, practical depth resolution requirements, with a reasonable number of arrays or cameras, also prohibits signal-to-noise optimization.

The second prior system to circumvent detector-array slowness uses an alternate gating scheme where the receiver consists of a detector array and a separate single detector. Two or more series of laser pulses are required; the first series of pulses finds the target depth much as the single-pixel underwater radar described above, except that the pixel of the single detector may now cover the same areas as the entire detector array. Once the target depth is determined, the detector array is gated to produce a two dimensional image at the correct depth. This system could be used with microchannel-plate image tubes or a Digicon. (A Digicon is a magnetic image tube which uses a diode array instead of a phosphor as the anode. A phosphor is used in a microchannel-plate image tube. Photocathode electrons are amplified by impact with the diodes rather than by means of a microchannel plate.) Again, the shortcomings of this system are the complexity of the need to link two systems and the number of pulses required for the initial depth scan.

Another multiple detector approach avoids the gating problem of detector arrays by providing each detector with its own high-speed digitizer. However, even an 10×10 array—a very low spatial resolution system—requires 100 times the weight and volume of the single detector system. For almost any practical application this is an extremely unsatisfactory system. Nevertheless, such a system has been tested to a limited extent for a space-based Strategic Defense Initiative (SDI) application. The system uses a Digicon and an 8×8 silicon diode detector array. Robert Ginaven, Erik Odeen, Mike Urbach, Frank Feiock, "Laser Radar IV" Proceedings of SPIE, Vol. 1103, pg. 61, Mar. 29–30, 1989. The result was a diode array with a very small field-of-view that must be electronically scanned over its photocathode to obtain the full field of view. Each scan requires a single laser pulse and introduces the same type of problem as the mechanical scanner. Roughly 1000 laser pulses are required to obtain the full field-of-view. However, at present because of the Digicon system's poor field-of-view, the inherent weight and power requirements of its magnetic subsystem, and its 64 digitizing systems, it is not a practical solution to the multiple detector underwater laser radar imaging problem.

A photon amplifier, either in the form of a Digicon or microchannel plate image tube, in the case of multiple-pixel laser radar configurations, is required to overcome internal sensor noise, increase signal-to-noise ratio and therefore optimize penetration depth. A single pixel system uses a photomultiplier tube for the same reason. As described in U.S. Pat. No. 5,099,128 a CCD array is not the only option to reading out multiple-pixel data. In the present invention a readout chip can be configured inside the image tube, using anodes or diodes to collect the signal rather than an external CCD array, thus allowing analog processing, in particular, high-speed data storage.

BRIEF DESCRIPTION OF THE PRESENT INVENTION

The present invention overcomes the aforementioned limitations by employing multiple capacitors in a specially designed integrated circuit capable of storing at each pixel the return signal over its full depth range. Rather than working in effect with arrays of cameras, each with a separate detector array, the present invention uses a single detector array, each detector having the ability to store multiple signals. Each detector in the two dimensional detector array is provided with on the order of 100 storage capacitors and switching between them can occur in less than 10 ns. It is not necessary to gate a photocathode on and off to obtain a depth slice. Switching from one capacitor to another, in effect, is a series of high-speed electronic range-gating operations which allows the acquisition of multiple depth slices. The data from this 100 or so depth slices are digitized and read out from the chip during the time it takes the laser to ready for the next pulse. Due to the design of the apparatus and its unique attendant electronics, there is sufficient time during the relatively long period between laser peaks in which to slice the incoming signal into planner segments, store them in capacitors and read out the information, thereby giving a microtome-like sectioning of the three dimensional returning attenuated light pulse. The photon amplifier incorporated into the present invention has sufficient gain to allow photon detection. Multiple image tubes and CCDs, rack mounted electronics and high speed digitizers are avoided, thereby providing orders of magnitude weight and power reduction.

Embodiments are provided where either electrons are collected at anodes or PIN diodes or phosphor produced photons are collected at PIN diodes during the time a return signal is expected.

It is an object of the present invention to provide a device for three dimension imaging of objects enveloped by transmitting and scattering medium and to overcome the problems of such prior systems associated with the need for mechanical scanning, small viewing areas, multipulse depth coverage and multiple two dimensional arrays. The device comprises a pulsed light source, means for projecting the light towards the object, optics for collecting any reflected or scattered light, improved sensors for detecting the reflected and scattered light, and novel drive and output electronics for timing and signal conditioning of data from the sensors and processing electronics and software for converting the sensor data of even a single pulse to a well resolved three dimensional image.

It is further the object of the present invention to provide such sensors which amplify the light and detect and store the light on an improved analog processing readout chip in sequential time intervals indicative of a depth dimension, without the need for a cumbersome sequence of cameras.

It is still further the object of the present invention to provide an analog-processing readout chip comprised of such an array of readout, storage and switching electronics and associated with a corresponding array of collectors or detectors.

It is yet a further object of the present invention to provide such apparatus for imaging sections of biological tissue in vivo near the skin surface.

Other objects of the invention will be disclosed in the detailed descriptions of the preferred embodiments that follow, and from the claims at the end of this disclosure.

DETAILED DESCRIPTION OF A PREFERRED EMBODIMENT OF THE PRESENT INVENTION

Figure 1:
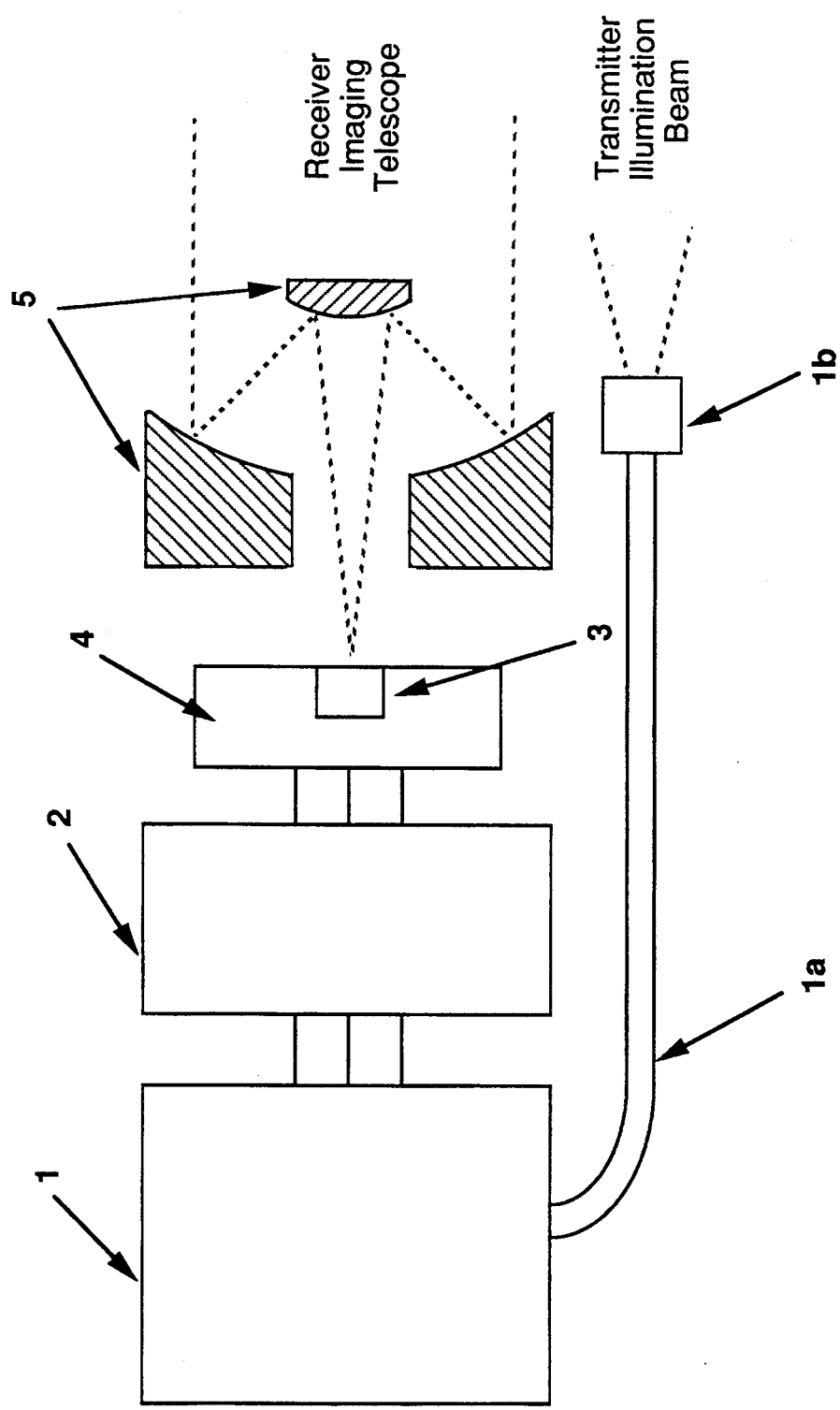
FIG. 1 is a side view of the preferred embodiment of the Three-Dimension Imaging Under Water Laser Radar (3DI-UDAR).

A preferred embodiment of the present invention, termed the Three Dimensional Imaging Underwater Laser Radar (3DI-UDAR) is depicted in FIG. 1. This embodiment produces three-dimensional image data (area and depth) from even a single laser pulse reflected from underwater objects, and processes the data to form an image. The system is capable of acquiring the three dimensional data on chip and processing the image data during the time of flight of a single laser pulse.

This preferred embodiment of the invention comprises a pulsed laser 1, with delivery system 1a, and collimator 1b, a data processing and laser control system 2, a sensor 3, output and drive electronics 4 associated with the sensor 3, and optics 5. The delivery system 1a and 1b may be centered with respect the optics. The operation of the system will be described in some detail after an initial description of the physical system.

Figure 2:
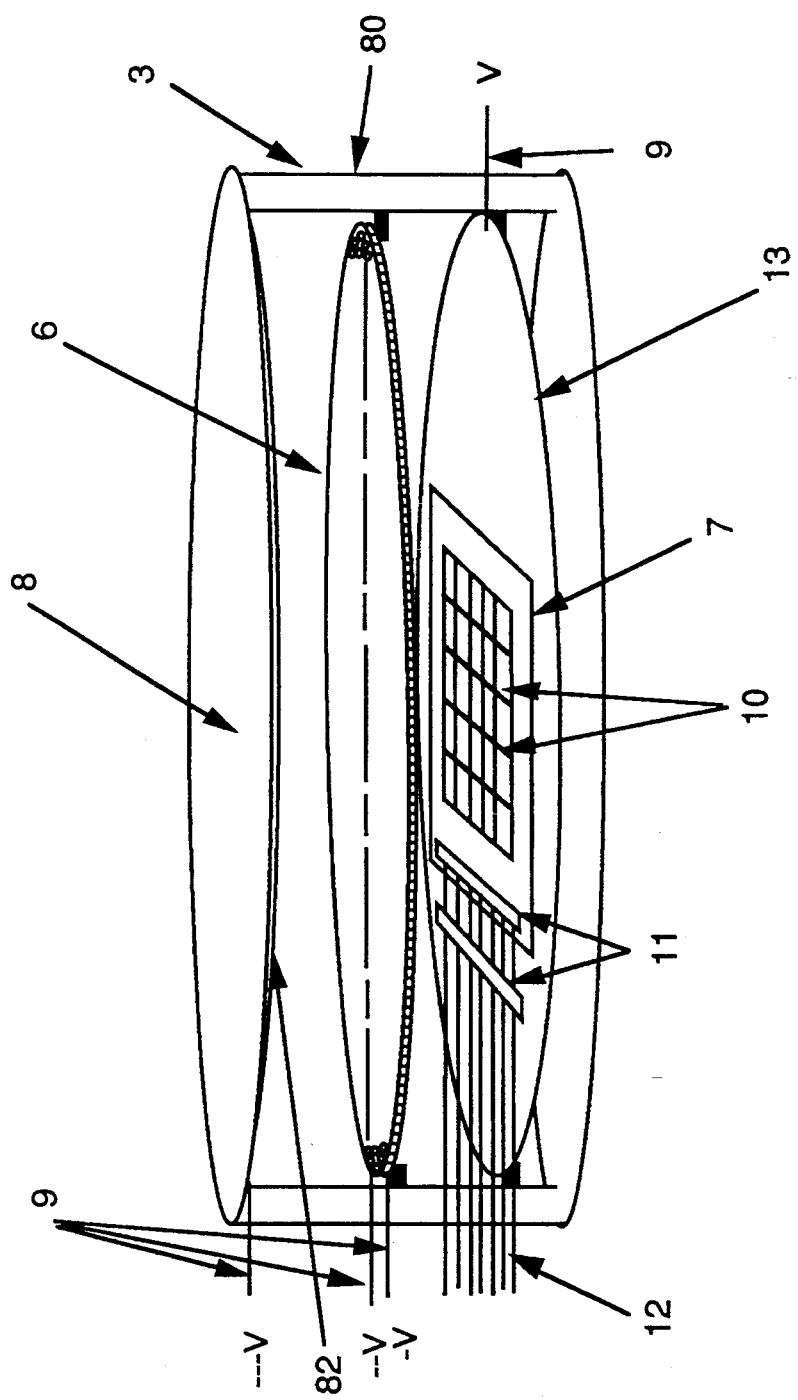
FIG. 2 is a perspective view of one of the sensors of the present invention.

FIG. 2 shows in more detail one embodiment the sensor 3 of the present invention. The sensor is comprised of a microchannel plate 6 and a readout analog-processing chip 7 inside a vacuum enclosure or tube 80. The entrance window 8 is made of a fiber optic material with the vacuum side 82 being a photocathode. Voltage lines 9 control the voltage drop between the photocathode and the microchannel plate 6, the voltage drop across the microchannel plate, and the voltage drop between the microchannel plate and the readout analog-processing chip 7. The processing chip 7 comprises unit cells 10 which collect and store the image data. The information on the unit cells are accessed via wire bond pads 11 and output and drive lines 12. The readout analog-processing chip 7 is supported by a chip carrier 13.

Figure 3:
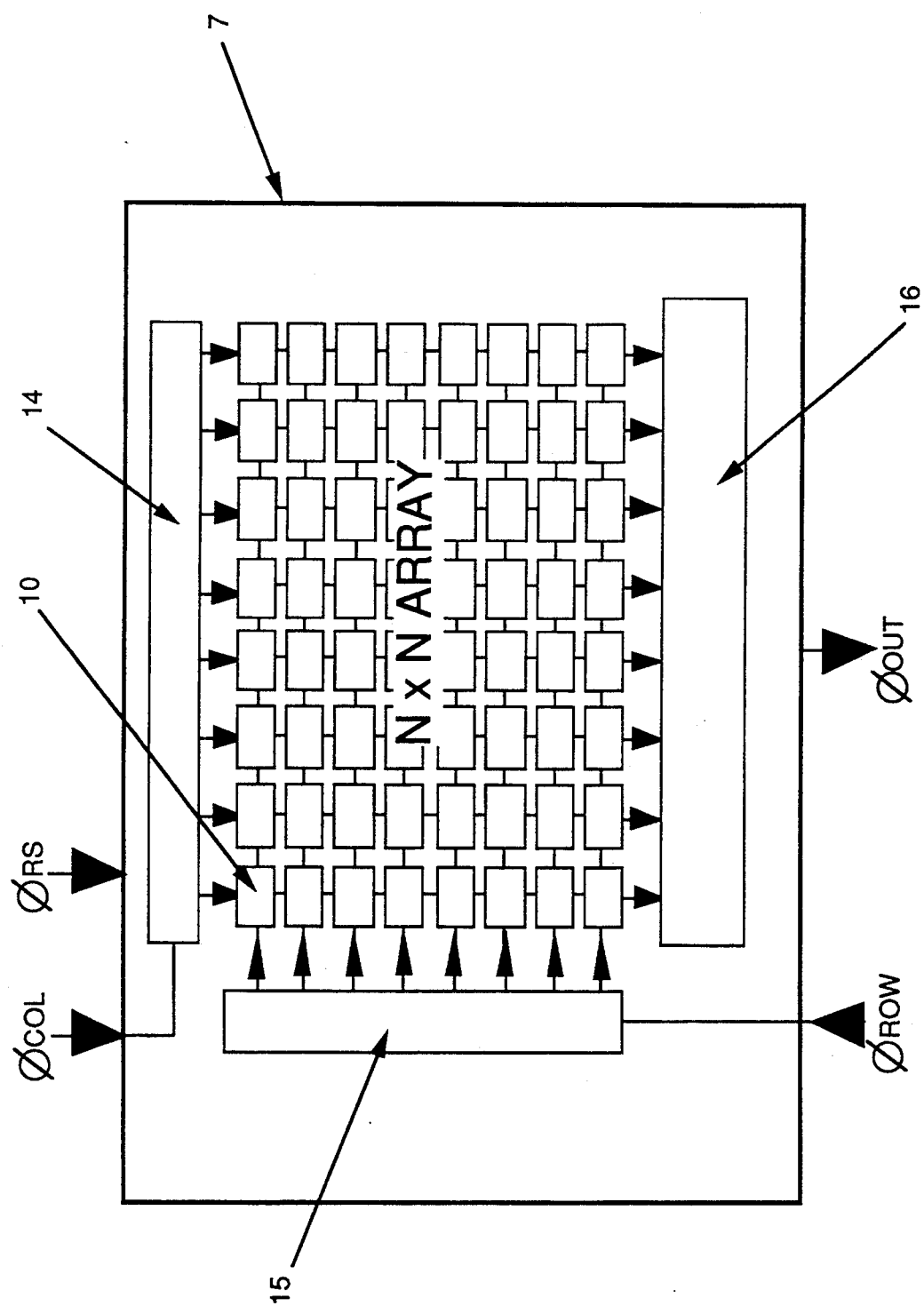
FIG. 3 is a top view of the analog-processing readout chip of the present invention.

FIG. 3 shows the readout analog-processing chip 7 in greater detail. It comprises an array of unit cells 10, a column shift register 14, which accesses the columns by means of the pulses $\phi$col, a row shift register 15, which accesses the rows by means of pulses $\phi$row, and a multiplier/output driver 16, which multiplexes, buffers and drives the data, $\phi$out, from each unit cell, off the chip. This will be explained in further detail below, where the operation of the device is explained. The row 15 and column 14 shift registers could in an alternative embodiment be replaced by address decoder circuitry.

Figure 4:
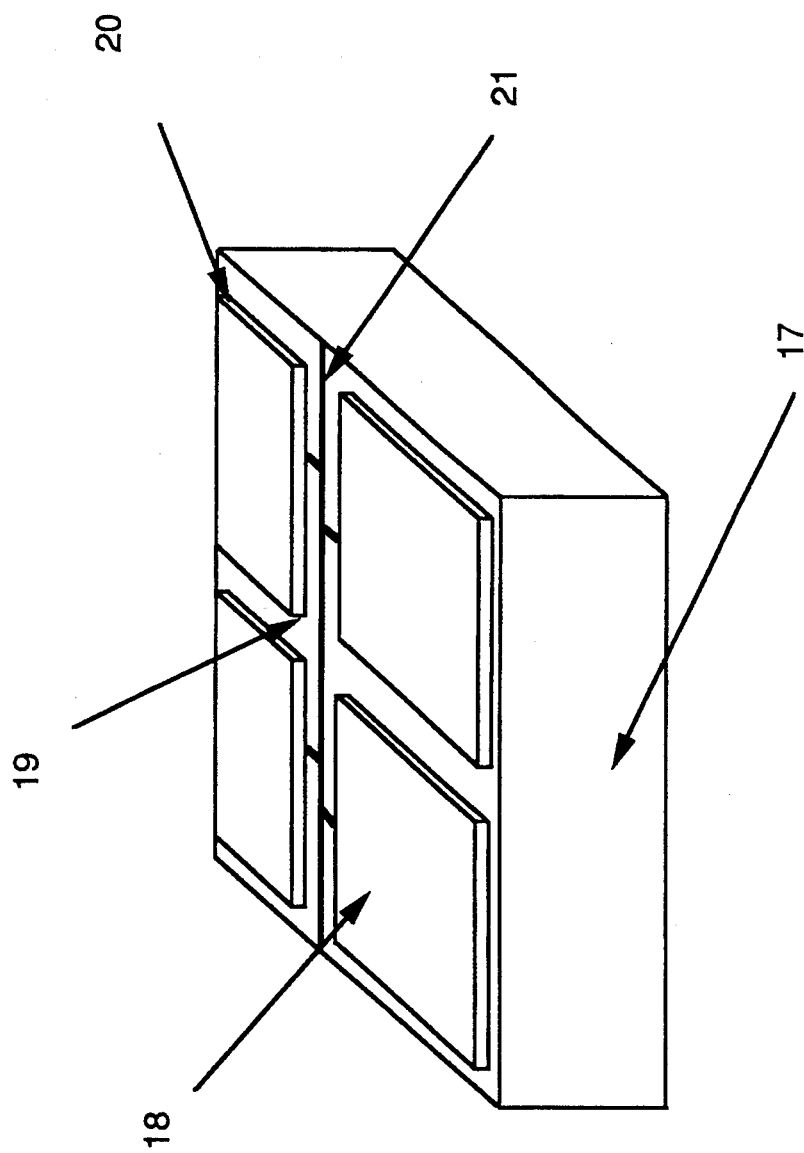
FIG. 4 is a perspective view of the small-pixel unit cell construction of the analog-process readout chip of the present invention.

FIG. 4 shows in greater detail the structure of the unit cell for small-pixel, large-array configurations. The unit cells are fabricated on a silicon substrate, using standard bulk CMOS processing, with the anodes 18 covering the unit cell electronics 19 but isolated from them by a field oxide 20. A conducting "via" connects the anode 18 with the unit cell electronics 19. Lines 21 conduct signals to and from the unit cell. "Via" connections of this type are known to persons skilled in the art of connecting electronics and an indium bump pad for hybrid construction. In an alternative embodiment where larger pixels are adequate the electronics may be placed alongside the anode and not covered by the anode. In that alternative the substrate may be sapphire rather than silicon and the electronics processing may be Silicon-on-Sapphire (SOS) rather than standard bulk CMOS.

Figure 5:
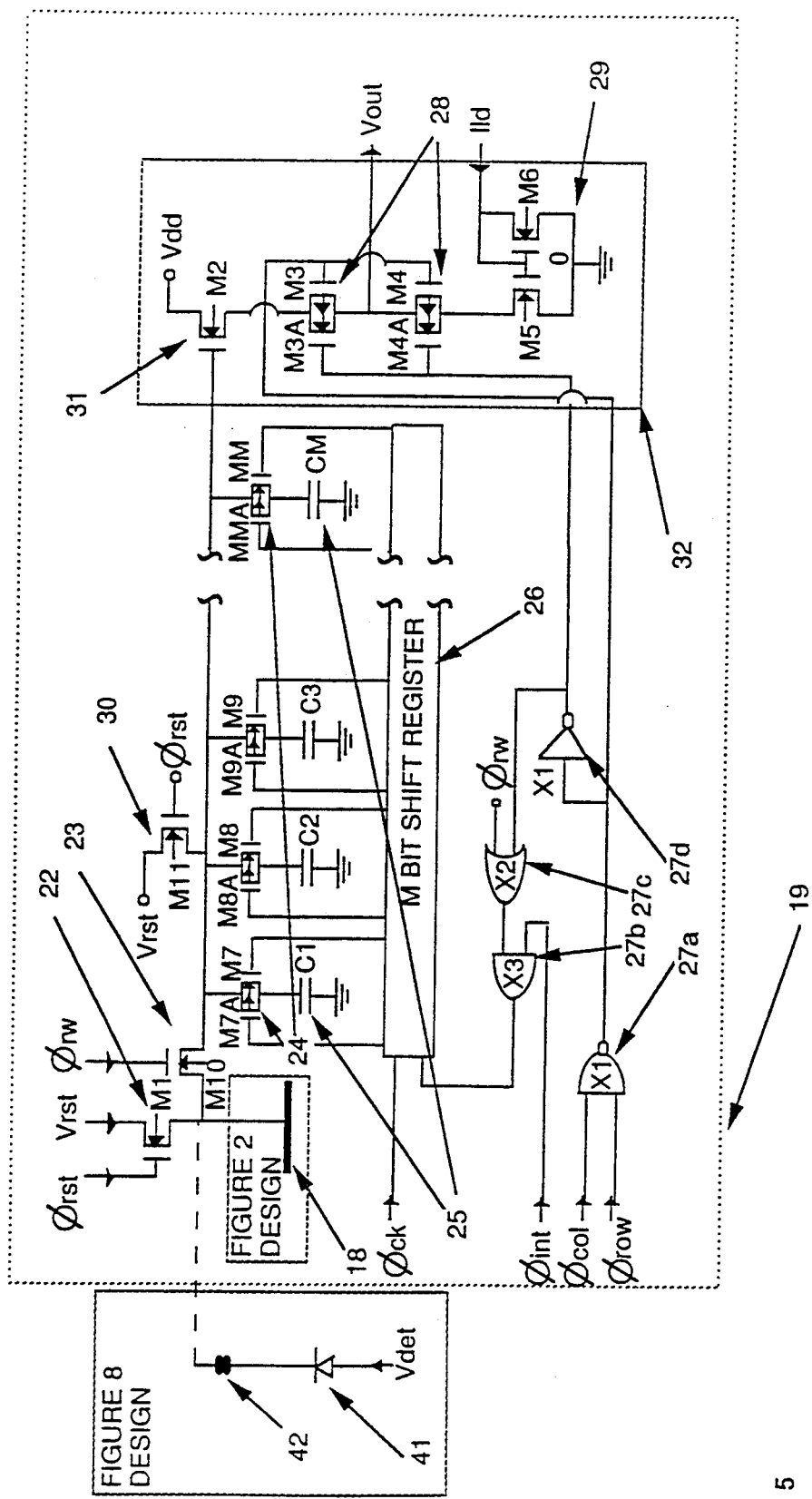
FIG. 5 details the analog-processing unit cell electronics of the present invention.
Figure 7:
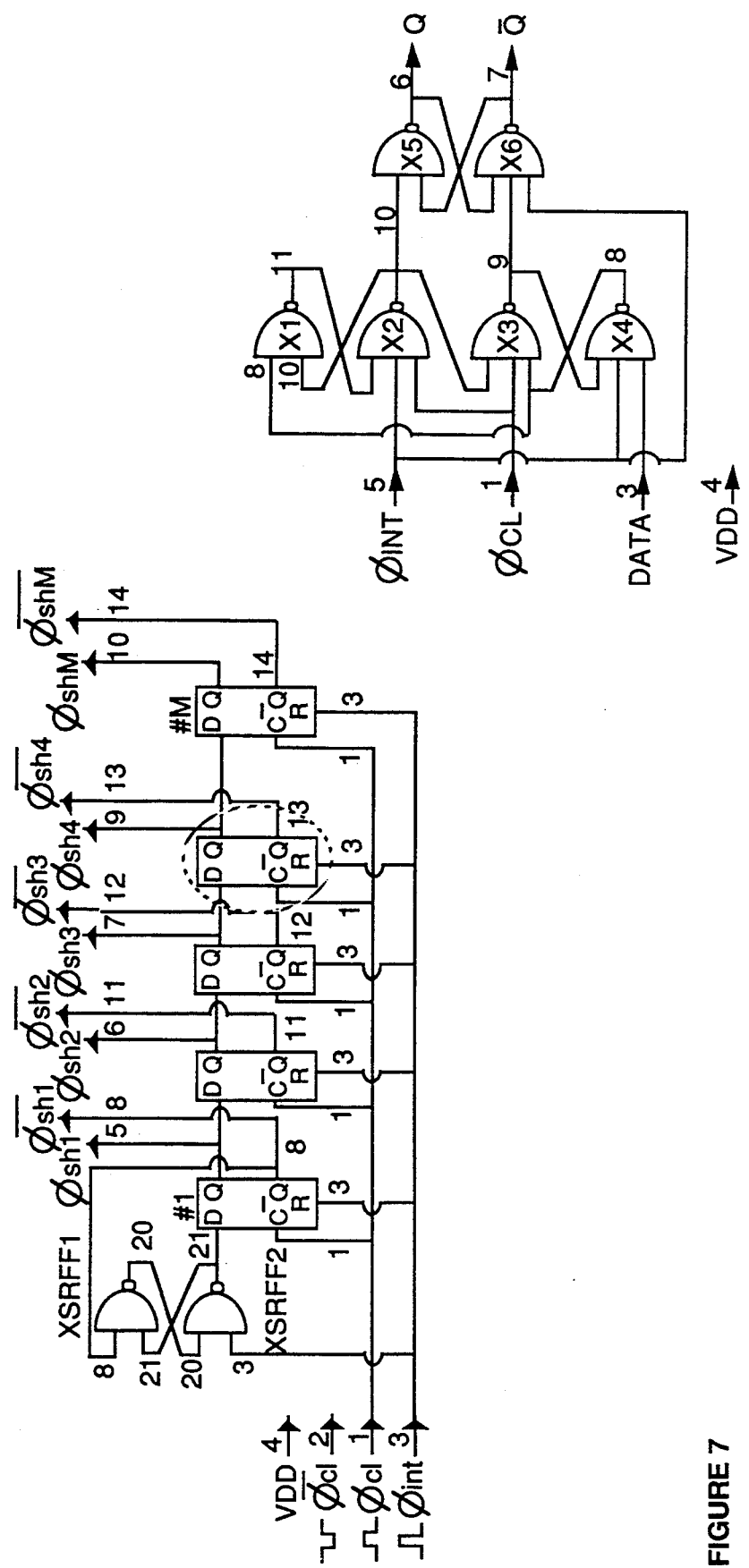
FIG. 7 is a detailed schematic of the cell high-speed shift register of the present invention.

FIG. 5 shows the analog-processing unit cell readout electronics 19. The anode signals are sequentially connected into M different storage capacitors 25 by means of the MOSFET switch 23 and the M analog switches 24 associated with each storage capacitor 25, the M bit high-speed shift register 26, selects the particular analog switch 25, sequentially via external pulses, $\phi$ck. Logic gates 27 a–d, via external pulses, reset the shift register 26 and connect the storage capacitors 25 to the analog output amplifier 32 during data readout. FIG. 7 shows in detail the high-speed shift register 26 of FIG. 5. The analog output amplifier 32 is composed of a source follower MOSFET 31, analog switches 28, which connect the source follower to the output line (Vout) and current mirror load 29. MOSFET switches 22 and 30 are used for resetting the anode during data accumulation. Only MOSFET reset switch 30 is used during data readout.

Figure 6:
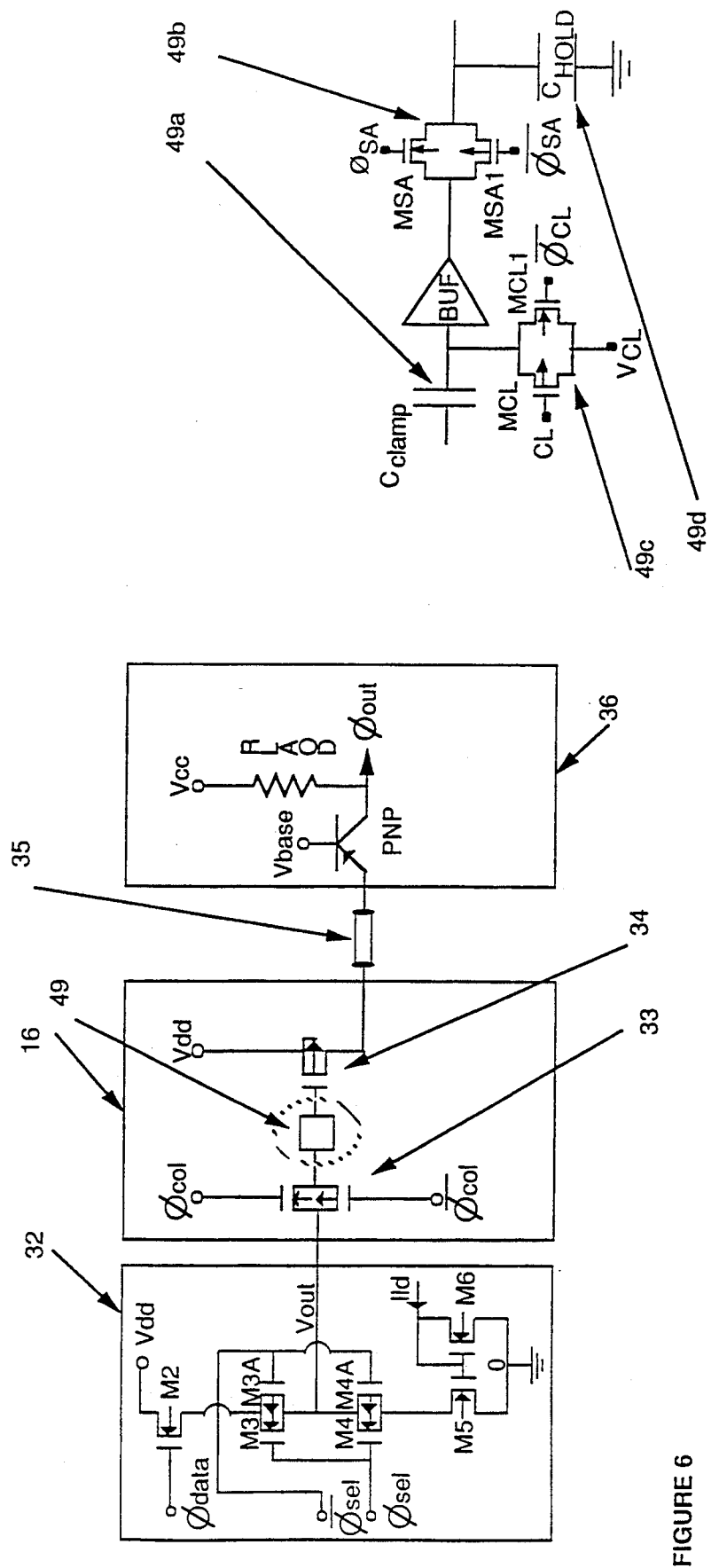
FIG. 6 details the multiplexer and output driver analog-processing chip circuitry and their relationship to the unit cell analog output amplifier.

FIG. 6 shows details of the connection between the analog output amplifier 32 found in each unit cell and the multiplexer and output driver 16 of FIG. 3. The multiplexer 33 is an analog switch; one multiplexer exists for each column. The selected column is connected to the current driver 34, through a delta reset ciurit 49. The current drive 34 is in turn connected to a cable 35 leading from the sensor 3 of FIG. 1 to the output and drive electronics 4. The output and drive electronics 4 interface circuit 36 is designed for high slew rates.

Figure 8:
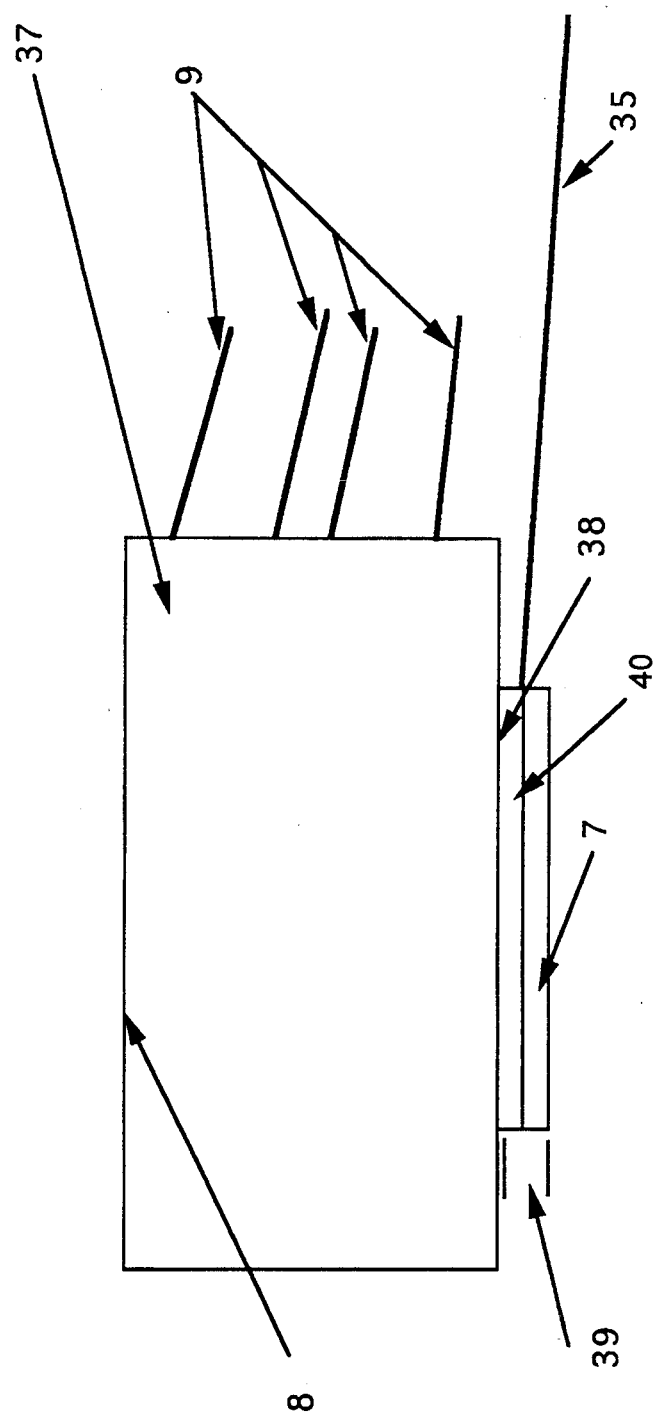
FIG. 8 is a diagram of a second sensor of the present invention.

FIG. 8 shows an alternative to sensor 3 of the present invention. This sensor is composed of a microchannel plate image tube 37 and readout hybrid 39. Many parts of the image tube 37 are similar to the sensor 3 shown in FIG. 2. Both have an input window 8 and voltage lines 9. Both contain a microchannel plate for amplification. A major difference is that the image tube 37 converts microchannel plate electrons to photons, which emerge via a fiber optics output window 38. Conversion occurs by means of a phosphor on the inside surface of the output window 38. The associated photon signal is eventually collected via a PIN diode array chip 40 and stored in the readout analog-processing chip 7 which is, in FIG. 8, external to the vacuum enclosure of the image tube 37. In the FIG. 3 embodiment the readout analog-processing chip 7 is internal to the vacuum enclosure and collects the electron signal from the microchannel plate directly rather than indirectly via the conversion to photons.

Optimal use of the FIG. 8 sensor design depends upon the use of a phosphor with a very-fast decay time. The decay time must be shorter than an integration time, i.e. the time each capacitor receives charge. An integration time is the time that the signal is stored on a single capacitor 25 in FIG. 5. Switching from one capacitor to another separates the integration times for each capacitor. The FIG. 2 sensor design does not have this restriction. In a third sensor embodiment, by incorporating the hybrid structure 39 inside a Digicon amplifier the phosphor decay time problem can be avoided. A Digicon does not use a microchannel plate for electron multiplication but instead a high voltage (many kilovolts) is applied directly between the photocathode and an anode composed of an array of semiconductor diodes, in an evacuated structure. Electrons from the cathode impact the diode and create about one electron-hole pair in the diode for an energy loss equal to about three times the diode bandgap. In the Digicon embodiment a magnetic field may also be imposed in a manner known to persons skilled in the art to prevent lateral movement of the photoelectron emitted at the cathode.

Figure 9:
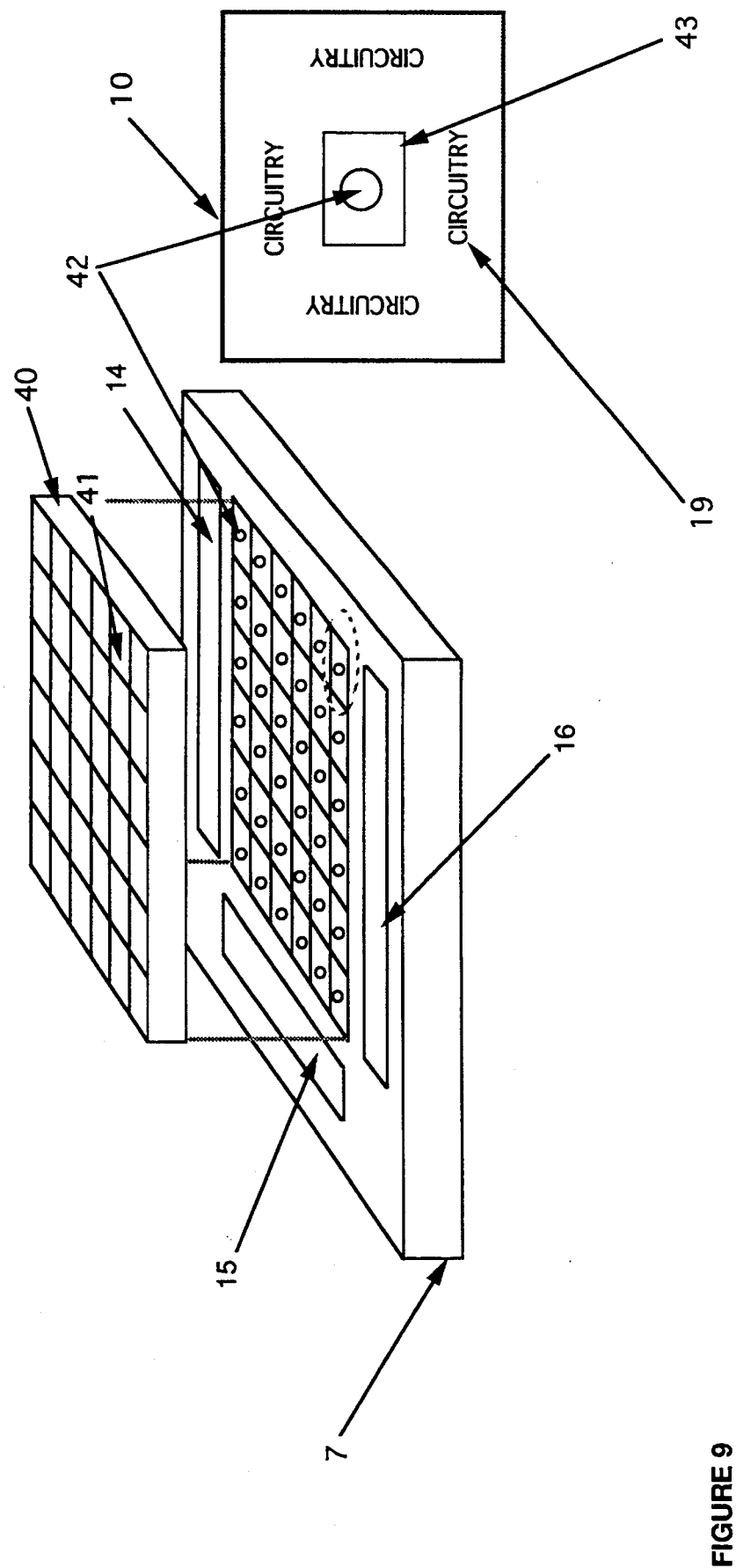
FIG. 9 shows the readout hybrid associated with the second sensor of the present invention.

FIG. 9 shows in greater detail, the readout hybrid 39, which is optically coupled to the output window 38 of the FIG. 8 image tube or is incorporated inside a digicon amplifier. The hybrid consists of the diode array chip 40, composed of individual P intrinsic N (PIN) diodes 41, the analog processing readout chip 7, and indium bumps 42, which electrically connect each PIN diode 41 with a single, corresponding, analog-processing readout chip unit cell 10. The analog processing readout chip 7 in FIGS. 9 and the lower portion of FIG. 9 which is shown in FIG. 3 are the same except that the indium bump pad 43 in the blowout of FIG. 9 replaces each of the anodes 18 in FIG. 4. The indium bump pad 43 and the anode 18 are made in the same way except that the indium bump pad has much smaller area and capacitance. The analog-processing readout chip circuitry, as described in FIGS. 3, 5, 6 and 7, are the same as those indicated on FIG. 9 blowout.

Figure 10:
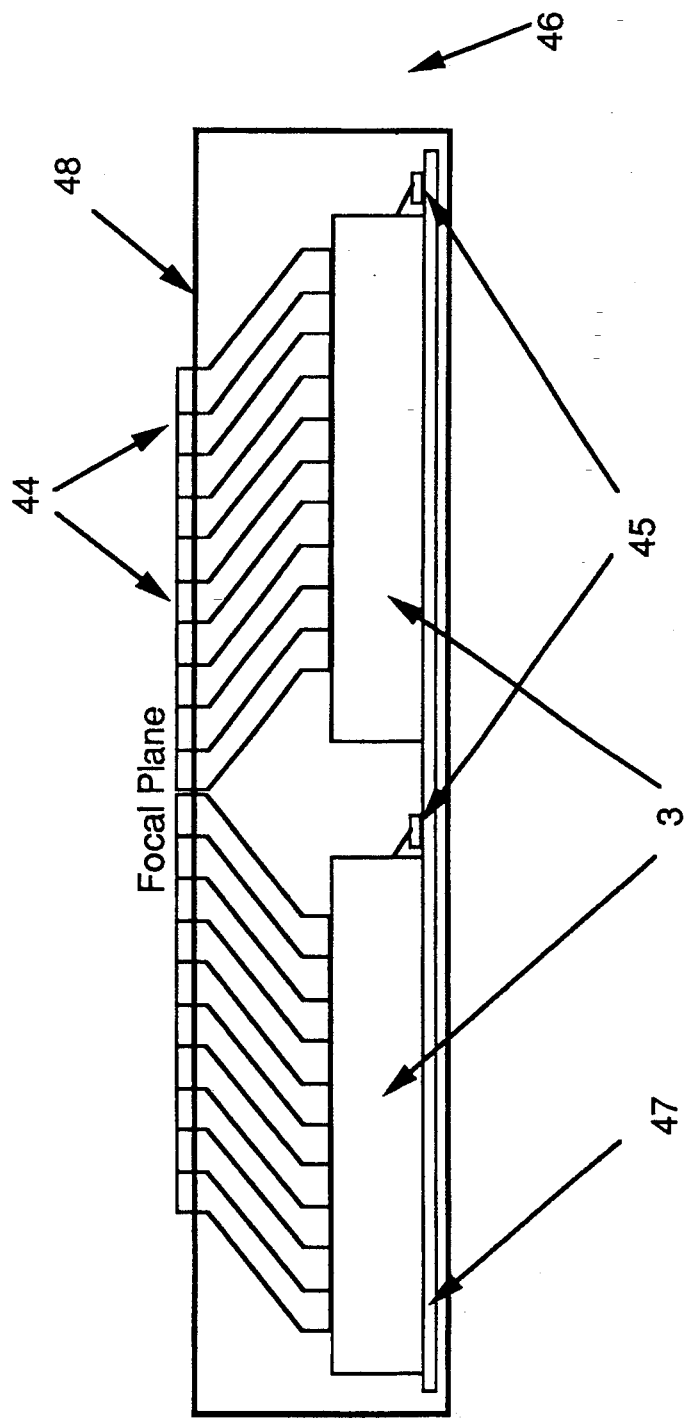
FIG. 10 shows a multi-sensor configuration for expanding the field of view of the present invention.

FIG. 10 is side view of an alternative configuration for extending the field of view of the sensor 3 and is required because the individual sensors cannot be butted up against each other to maintain a continuous pixel array. The field of view extension is composed of multiple sensors coupled to the focal plane by optical fibers 44. Each fiber optic cable 44 corresponds to one pixel. The multiple sensors 3 are supported by a sensor board 47 and electrical signals from and to the individual sensors are connected to the drive and output electronics via wire bond pads. The sensor board is connected to the off-sensor processing electronics by means of a cable 46. Normally buffers, sample-and-hold circuits and analog-to-digital (A/D) converters would be included on the sensor board or in the output electronics 4 (FIG. 1). Two or more individual sensors can be configured as in FIG. 10 if a field-of-view extension is required.

Figure 11:
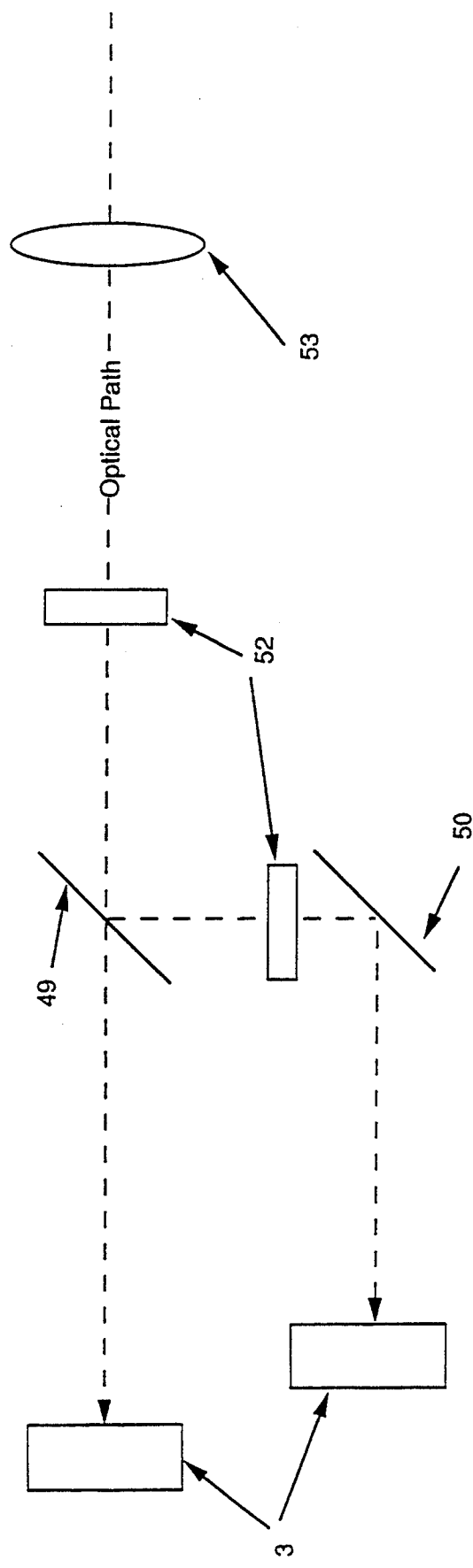
FIG. 11 shows a multi-sensor configuration for increasing the depth resolution of the present invention.

High resolution in depth, on the order of centimeters for example, is restricted because of the short time in which light travels this distance. Depth resolution in most laser radars depends upon the time resolution of the receiver and the length of the laser pulse using an integration time that is larger than usually required for high resolution. FIG. 11 is a side view of a configuration for enhanced depth resolution of the present invention with a single laser pulse. The optical paths of the multiple sensors 3 are different resulting in different times of arrival (or different phases) of the laser pulse at the sensors. Since signal integration time begins and ends simultaneously at all the sensors, the difference in signals at corresponding detectors in the sensor detector arrays can be used to resolve the depth to the optical path length between the sensors. The returning laser beam is focused by means of the primary optics 53 and secondary compensating optics 52. The returning beam is separated into multiple beams, one for each sensor 3, by means of beam splitter 49 and directed to off axis sensors by means of mirror 50. More than two sensors for more than two optical paths are possible with a generalized FIG. 11 configuration. The beam splitters can be eliminated for the enhanced depth resolution configuration by a multiplication of the primary optics, using as many primary optics as there are sensors. Higher resolution than normally achieved with a particular laser pulse length and integration time can also be achieved with multiple laser pulses and a single sensor rather than multiple sensors. The timing of either the integration period or the initiation time of the laser pulse is changed from pulse to pulse by a small time interval, less than an integration period. Depth resolution equal to the velocity of light times the small time interval can be achieved by comparing data at corresponding pixels for the different pulses.

In operation the Three Dimensional Imaging Underwater Laser Radar (3DI-UDAR) launches a short blue-green laser pulse into the water from an airborne or underwater platform, and stores the return signal from a single pulse in multiple time slices on a two dimensional detector array. The number of time slices can vary from approximately 1 to a few hundred. Each time slice represents information from a particular depth in the water and this information is stored, as an analog signal, on separate storage capacitors at each detector. The close proximity of the storage capacitors to the detector, on an integrated circuit chip of the present invention makes possible the high-speed switching, necessary for sequential time-frame data storage. The three-dimensional image data is read off the array and digitized during the relatively large time between laser pulses (typically a few milliseconds). FIG. 1 depicts the entire 3DI-UDAR system; the sensor 3 contains high-speed analog storage components of the receiver.

Unlike ordinary electromagnetic propagation in the atmosphere, there is a constant backscattered return from suspended particles in the ocean, referred to as veiling luminance. This veiling luminance is a continuous noise source whose effect depends upon the length of the detector system integration time. The smallest practical integration time is a fraction of the length of the laser pulse. The 3DI-UDAR integration time in normal operation is matched to the laser pulse length and therefore reduces this and all "continuous" noise sources (detector dark current and extraneous light sources) to a minimum. Since maximum laser penetration depth depends upon the signal to noise ratio, 3DI- UDAR penetration depth is as large as possible because the noise is as small as possible. To avoid saturation due to the large initial veiling luminance or surface backscatter the receiver is usually turned on after the laser pulse has propagated a certain distance in the water.

Because of water absorption and scattering, the magnitude of the target return (and the veiling luminance) decays almost exponentially with depth, and a large receiver dynamic range is required to obtain good depth operational range. The 3DI-UDAR solves the range problem by storing the return signal over the full depth range at each pixel in the two dimensional array, on multiple capacitors. Maximum dynamic range is achieved with a low-noise readout and lightweight digitization electronics. As mentioned, the stored time-slice signals are digitized during the laser inter-pulse period and then processed to determine the time at which a return occurred. Range is determined from time of flight and the velocity of light. Low-noise and large dynamic range are made possible by the 3DI-UDAR analog-processing readout chip 7 (FIG. 2 and FIG. 8), which is either directly coupled to the electrons from a microchannel plate amplifier 6 (FIG. 2) or indirectly coupled to the electrons from the microchannel plate amplifier via a phosphor and a PIN diode array 40 (FIG. 8) or directly coupled to the electrons via a PIN diode array as in a digicon. To obtain maximum depth each pixel in the receiver detector array must be sensitive enough to detect return signals measured in the 10's or 100's of photons. This requires a photon signal amplifier with enough gain to amplify the signal above the receiver noise. The preferred 3DI-UDAR photon amplifier incorporates a photocathode and a microchannel plate and has sufficient gain to easily accomplish the photon detection. Another embodiment uses a digicon.

To obtain a lightweight, cost effective system each detector cannot have its own real-time high-speed digitizer and amplifier. Real-time, high-speed digitizers generally require rack mounted electronics. The 3DI-UDAR analog-processing readout chip 7 stores time-slice signal information and therefore avoids high-speed digitizers. It avoids the requirement of a digitizer per detector by multiplexing the signal information off the detector array during the laser inter-pulse time. Because of the signal storage and inter-pulse-time readout the 3DI-UDAR avoids the large volume, weight and power requirements of rack-mounted electronics. All the high-speed digitization electronics can be replaced by lower speed digitizer chips with orders of magnitude weight reduction. Because the 3DI-UDAR multiplexes the multiple-detector information off the chip during the laser inter-pulse-time duplication of digitization electronics for each detector is avoided.

Focused light from laser reflections and background is detected by the sensor 3. In FIG. 2, laser light passes through the sensor entrance window 8 and causes electrons to be emitted from the photocathode on its underside. These electrons are accelerated into the microchannel plate 6 where, due to secondary emission from the microchannel plate walls, the electron signal is amplified. In the FIG. 2 sensor design, the amplified electron signal is collected on metal anodes 18 (FIG. 4 and FIG. 5) of the analog-processing readout chip 7 during the integration period (about 0.1 to 50 ns). Alternately the amplified electron signal is converted to a photon signal by means of a phosphor on the inside of the microchannel plate image tube output window 38 (FIG. 8) and converted back to an electrical charge by a P intrinsic N diode array 40 (FIGS. 8 and 9). Alternatively electrons can be accelerated into the diodes for amplification when a diode chip and readout chip hybrid is placed inside the vacuum enclosure. While collecting electrons, each anode 18 (FIGS. 4 and 5) or while collecting phosphor produced photons, or electrons each PIN diode 41 (FIG. 9 and FIG. 5) is electrically connected to a small on-chip storage capacitor 25 (FIG. 5). At the end of the integration period the anode 18 or diode 41 is switched to another storage capacitor 25 (FIG. 5) and the initial voltage reset. The collecting, storage and switching process continues throughout the time a return signal is expected.

The drive and output electronics 4 (FIG. 1) reads out all data in the analog-processing readout chip and delivers it in digital form to the data processing system 2; in addition it provides all the necessary timing, biases, and signal conditioning to ensure this operation.

Data from the analog-processing readout 7 (FIG. 3) is fed directly into Analog Processor (AP) electronics, part of the output electronics, which condition the readout output signal for compatibility with the Analog to Digital (A/D) converter. The functions of the AP include signal buffering, clamp and sampling and output signal amplification. The necessary timing to operate the AP and the A/D chips is derived from drive electronics, Emitter Coupled Logic (ECL) electronic components. A/D converter chips are commercially available from ILC Data Devices as 12 bit 10 MHz. The drive electronics provides all of the required clocks to operate both the analog-processing readout and the output electronics. The output of the AP is fed directly into the A/D converter chips. After data is output from the A/D it will be stored by the output electronics 4 for three dimensional image processing in the data processing system 2.

A representative small-pixel cross section of the analog-processing readout monolithic structure is depicted in FIG. 4. Starting material is standard bulk silicon 17 and the process technology will utilize Complementary Metal Oxide Semiconductor (CMOS) technology. Both P-channel and N-channel transistors are fabricated to reduce gate propagation delay and power dissipation. The sensitivity of the 3DI-DAR is determined by the value of the sense capacitance in each unit cell. In the FIG. 2 design the anode is the dominant source for this capacitance. The anode 18 (FIG. 4) is constructed of thick oxide (about 10,000 Angstroms) 20 (FIG. 4) to reduce this capacitance and increase the readout sensitivity. Alternatively for large pixel designs where the anode capacitance would be prohibitively large (roughly above a few picofarads) the starting material is preferably sapphire and the processing technology is preferably CMOS silicon on sapphire (SOS). For large-pixel SOS construction it may not be necessary to fabricate the readout electronics under the anode: it can be fabricated along side the anode. Small-pixels are desirable for high spatial resolution, but because of the larger signal-to-noise ratio for a given return signal large pixels maintain their spatial resolution to a greater depth than small pixels. Therefore, the signal from small-pixels signals can be added during the data processing to increase the signal-to-noise ratio if decreasing the spatial resolution is acceptable. Small-pixels therefore offer greater flexibility than large pixels but at a cost of greater data-processing complexity.

In the small-pixel, FIG. 2, sensor design the readout electronics 19 (FIG. 4) will be constructed between and under each anode due to the limited silicon area available for each unit cell. Silicon doped N-wells will serve as a readout substrates for the construction of PMOS transistors. Most of the space between the anodes will be taken up by either the unit cell electronics or by the interconnect service lines feeding each unit cell. In the small-pixel FIG. 8 sensor design the construction is exactly the same as the FIG. 2 sensor design except that the anode becomes an indium bum pad 43 (FIG. 9) and is therefore much reduced in size (decrease in area by roughly a factor of 100). The linear dimension of the small pixel is preferably about 250 μm or smaller with size depending upon a number of system and scenario issues including the spatial and depth resolution requirements. The linear dimension of the large pixel is preferably about 1000 μm depending upon system and scenario requirements.

The analog-processing readout chip 7, (FIG. 3) employs the direct readout approach, as opposed to a CCD approach. Each unit cell 10 (FIG. 3) independently accesses the chip multiplexer and output driver 16 (FIGS. 3 and 6) rather than having the data transferred from unit cell to unit cell before it reaches the output line. Each unit cell has its own analog output amplifier 32 (FIGS. 5 and FIG. 6) or source follower which allows the unit cell to drive the output line to the column multiplexer 33 (FIG. 3 and 6) and output driver 34 (FIGS. 3 and 6). The direct readout approach yields a higher signal to noise ratio than the CCD approach and allows greater dynamic range and data transfer flexibility. Each unit cell electronics 19 is addressed by means of a column 14 and row 15 shift register (FIG. 3). An alternate preferred addressing scheme is a random access address decoder. The preferred array size in FIG. 3 is from 10×10 to 2000×2000, depending upon system and scenario requirements.

The analog-processing readout unit cell integrated circuit is shown in FIG. 5. This circuit represents a new and innovative design approach to sensing a charge from a microchannel plate amplifier at a very high integration rate. It incorporates multiple switched storage capacitors per unit cell or pixel. Each unit cell has a memory capacity for preferably 30 to 200 data samples or integrations. Each integration cycle is processed preferably within 0.1 to 20 ns including a short reset period. The integration rate is externally controllable and could be larger if the application required it. All data samples in each unit cell are read out at the end of the allocated data acquisition time. The data acquisition time is preferably the total time for light to travel to its greatest depth and return to the receiver.

The analog-processing readout circuit 19 (FIG. 5) functions as follows: The $\phi rw$ (read/write) pulse is set high (write) and a high $\phi int$ pulse is sent from the timing generator. A high on OR gate 27c transmits a high to AND gate 27b which together with the high $\phi int$ transmits a high to the shift register 26, resetting it to a ground or off state, deselecting all storage capacitors. $\phi int$ then goes low. $\phi rw$ stays high during the entire data taking operation and connects the anode 18 (or the PIN diode 41) to the storage capacitor line by turning on transistor M10 23. The analog-processing readout is activated by clocking the shift register as depicted with clocking pulse $\phi ck$ thereby shifting a logical one into the first bit of the shift register. This action selects the first capacitor C1 in the memory bank by turning on both transistors M7 and M7A. Each cell in the memory bank is made up of a capacitor that is discharged by electrons collected by the anode 18 (or photons collected by the PIN diode 41). The selected capacitor is first reset to the pre-determined value Vrst by an externally timing generator reset pulse, $\phi rst$, before anode signal integration can occur. The anode sensing element 18 (or PIN Diode 41) and the storage capacitor it is currently connected to is reset by turning on reset transistor M1 22. This transistor has a large W/L ratio for low resistance in order to rapidly charge the anode capacitance in a few nanosecond or less. M1 22 is the largest transistor in the unit cell.

The period following the reset pulse is the integration time associated with the selected memory capacitor. Prior to the first reset pulse all the voltage lines 9 of the sensor 3 must be at their operational values. No matter what the electron flux on the anode 18 integration does not proceed until the reset pulse goes low. The integration period is terminated by deselecting the current memory capacitor C1 and selecting the next memory capacitor C2 by pulsing the shift resister 26. The above described reset and integration process is repeated for all memory capacitors. All acquired data is now stored in the capacitors and must be read out. Just as at the start of the integration periods, at the end of the last integration period the shift register is again initialized to the ground state thereby deselecting all storage capacitors. The read/write pulse $\phi rw$ then goes low disconnecting the anode from the memory cells in preparation for the readout memory cycles. In this way any events occurring at the anode will not affect the data being read out.

The unit cell readout cycles start by first selecting a row and column unit cell address via pulses $\phi col$ and $\phi row$. Once a unit cell is selected, the NAND gate 27a transfers a low to inverter 27d and turns on the PMOS side of output line (Vout) analog switches 28. The high from the inverter turns on the NMOS side of the output line analog switches 28 and the source follower M3 31 of the output amplifier 32 is enabled. The read memory cycle is initiated by selecting the first memory cell C1 by clocking $\phi ck$ thereby shifting a logical one into the shift resister. This action turns on transistors M7 and M7A thereby connecting capacitor C1 to the analog output amplifier 32. The voltage on the selected capacitor is sampled (actually clamped) by the delta reset circuitry 49 of FIG. 6. The selected memory capacitor is then reset to its previous value—the reset value, Vrst,—and its voltage is sampled again by the delta reset circuitry. The difference in the output voltage Vout shortly before and after reset is proportional to the charge collected during the particular integration period that the capacitor was discharged. The next sequential memory capacitor is selected by pulsing the clock line $\phi ck$ thereby sequencing the shift resister. This process is repeated for all storage capacitors, C2 to CM in the unit cell. The next unit cell is selected by row and column address and the process is repeated until all data in each unit cell is read out.

The clamp and sample procedure described above on the chip output line $\phi out$ (FIG. 3 and FIG. 6) is performed on the output electronics 4 (FIG. 1) by a delta reset circuit. The output of this circuit is the voltage difference between the clamp and sample voltage. The clamp voltage is representative of the signal in the output electronics memory cell while the sample voltage is the reset or reference value. In this way, the actual voltage in the memory cell is output relative to its own reference frame without any induced offset voltages. An important aspect of this circuit is the noise reduction that it provides to the output signal $\phi$out. The predominant noise source in the unit cell readout electronics is 1/F noise. This noise is generated by MOSFET transistors and is very problematic for all readouts that have low noise specifications. The delta reset circuit, by design, addresses this problem. Since 1/F noise is correlated in the output signal $\phi$out, a signal sample technique is used to correlate the noise out. This noise is simply correlated out by the high frequency clamp and sampling action of the delta reset circuit. This reduction in noise has the effect of increasing the sensor sensitivity by increasing the readout signal-to-noise ratio and thereby detecting objects in water at a greater depth. The function of the analog output driver and multiplexer circuit shown in FIG. 6 is to select the activated unit cell analog output line Vout and deliver this signal $\phi$out to the output electronics 4 at a relatively high frequency rate. One sure way to provide this high data rate is to incorporate current drivers. A current driver 34 will then assure high slew rates for the analog output line $\phi$out that feeds the output electronics. Since the activated column address line is always paired with the activated analog output line Vout, locating and selecting the Vout line is straight forward. As described above, high-speed CMOS switches driven by column address lines are used to gate on the selected Vout line. The selected output is then fed into a current driver 34 via the column multiplexer 33 (which was turned on by $\phi$col) and delivered to the output electronics.

The main function of the shift register 26 (FIGS. 5 and 7) is to sequentially select each memory cell in the unit cell at a very high repetition rate. This function is accomplished by using D-type flip flops to transfer binary information from one flip flop to the next by the action of a transfer pulse $\phi$ck. Each bit of information received at the input of the shift register is clocked or transferred to the next flip flop (FF). The unit cell shift register clocks a logical one through the shift register in M clock pulses, $\phi$ck. This is done by providing a logical one at the input to the first FF before and during the first clock pulse. After the first clock pulse, the first FF in the sequential chain of FF's will have a logical zero as input. This action will insure that the sole logical one will be propagating through the shift register. Each transfer or propagation through the FF will deselect and select a memory cell.

The circuit shown in FIG. 7 is the implementation of the unit cell high speed shift register. The shift register is put in the ground state by the initialization pulse, $\phi$int, thereby producing logical zero's at the Q's of the D-type flip flops. The logical gates used in the construction of these D-type flip flops are illustrated in the FIG. 7 blowout. The set/reset flip flop which is made up of NAND gates (XSRFF1 and XSRFF2) is also initialized at this time to produce logical one at the D input (node 21) to the first FF. The first clock pulse ($\phi$ck) transfers this D input (logical one; node 21) to the Q output (node 5). This action causes the Q bar output (node 8) to change to a logical zero causing the state of the set/reset FF (node 21) to change to a logical zero. The next clock pulse ($\phi$ck) transfers the logical one on the first FF (node 5) to the Q output on the second FF (node 6). The first FF transfers the D input (node 21), now logical zero, to the Q output (node 5). The Q bar output (node 8) on the first FF changes to a logical one but does not affect the state of the set/reset FF. The third clock pulse transfers the logical one at the D input to the third FF (node 6) to the Q output (node 7). This transfer or shift action is repeated for each clock ($\phi$ck) pulse generated.

Because of the finite size of current integrated circuit chips and the decrease of chip yield with size it may be necessary to expand the field-of-view (FOV) without increasing chip size. FIG. 10 illustrates a configuration of accomplishing this FOV increase. Because of the thickness of the sensor 3 walls they cannot be butted up against each other and maintain a continuous pixel array. In FIG. 10 a continuous pixel array is maintained at the focal plane of the optics, by means of fiber optic cables 44; one cable for each pixel. These cables are then diverted to multiple sensors 3.

There are some application that require extremely high depth resolution, for example on the order of centimeters. To obtain this resolution using electronic switching to different storage capacitors is very difficult because the integration time would have to be on the order of 0.1 ns and the switching time a fraction of this value. Currently, integrated circuits and associated drive electronics are not that fast. A method for performing high resolution three dimensional imaging, with a single laser pulse, is illustrated in FIG. 11: multiple sensors are turned on simultaneously but the difference in their optical path lengths is consistent with the depth resolution required. In FIG. 11 two (or more) sensors 3 view the same scene but at slightly different times. This is accomplished by means of beam splitters 49, mirrors 50 and secondary compensating optics 52. Alternatively each sensor could have its own primary optics. Other methods for accomplishing this high resolution require more than one laser pulse and include electronically changing the relative timing between the initiation of the laser pulse and the analog processing readout chip reset pulse, between laser pulses, moving the sensor forward or back during the laser interpulse period and moving the laser forward or back during the laser interpulse period.

Although the invention has been specified in terms of preferred embodiments, it is intended that the invention shall be described by the following claims and their equivalents.

What is claimed is:

1. A device for imaging sections of a three dimensional object immersed in a light conducting medium comprising
   a pulsed light source,
   means for transmitting light from said pulsed light source into said medium,
   optics for collecting light from said medium during a sequence of time intervals between the transmission of successive pulses from said light source,
   sensor means for detecting said collected light, said sensor means comprising
      means for amplification of said collected light and for providing an electrical signal corresponding to said amplified light,
      an analog-processing readout chip comprising
         a plurality of unit cell means each comprising a plurality of storage means for receiving electrical signals from said amplification means during said time intervals, and
         readout electronics adapted to provide signals to output electronics from said storage means, drive electronics for providing voltages and for providing timing for said readout electronics, and output electronics for converting the signals stored on said storage means from analogue to digital signals.

2. The device for imaging sections of a three dimensional object immersed in a light conducting medium of claim 1 wherein each of said storage means is a capacitor.

3. The device for imaging sections of a three dimensional object immersed in a light conducting medium of claim 1 wherein said means for amplification comprises a microchannel plate.

4. The device for imaging sections of a three dimensional object immersed in a light conducting medium of claim 1 wherein said means for amplification comprises a digicon.

5. The device for imaging sections of a three dimensional object immersed in a light conducting medium of claim 1 wherein said sensor means comprises PIN diodes.

6. The device for imaging sections of a three dimensional object immersed in a light conducting medium of claim 5, wherein said PIN diodes are each electrically connected to said readout electronics on said analog-processing readout chip by metal bumps.

7. The device for imaging sections of a three dimensional object immersed in a light conducting medium of claim 1 wherein said sensor means comprises anodes.

8. The device for imaging sections of a three dimensional object immersed in a light conducting medium of claim 1 wherein said readout electronics comprises a shift register adapted to sequence between a plurality of said storage means.

9. The device for imaging sections of a three dimensional object immersed in a light conducting medium of claim 1 wherein said readout electronics is adapted for direct readout with a source follower for each unit cell.

10. The device for imaging sections of a three dimensional object immersed in a light conducting medium of claim 1 wherein said analog-processing readout chip comprises a current driver adapted to drive the data signals off the chip.

11. The device for imaging sections of a three dimensional object immersed in a light conducting medium of claim 1 wherein said analog-processing readout chip is adapted to complete a processing cycle during an integration time interval less than about 20 ns.

12. The device for imaging sections of a three dimensional object immersed in a light conducting medium of claim 1 wherein said analog-processing readout chip is adapted to reset in a time interval less than 10 ns.

13. The device for imaging sections of a three dimensional object immersed in a light conducting medium of claim 1 wherein said analog processing readout chip comprises a delta reset circuit for enhanced signal to noise ratio.

14. The device for imaging sections of a three dimensional object immersed in a light conducting medium of claim 1 wherein said analog-processing readout chip comprises bulk silicon CMOS components.

15. The device for imaging sections of a three dimensional object immersed in a light conducting medium of claim 1 wherein said analog-processing readout chip comprises silicon on sapphire CMOS components.

16. A sensor for detecting the presence of light comprising a means for amplification of light, an analog-processing readout chip comprising a two dimensional array of unit cells, each unit cell comprising a plurality of means for collecting or detecting signal data from said amplification means and readout electronics comprising a plurality of storage means, each associated with a distinct reflected light return time interval, and means for sequentially switching said collecting or detecting means to said storage means.

17. The sensor for detecting the presence of light of claim 16 wherein each of said storage means is a capacitor.

18. The sensor for detecting the presence of light of claim 16 wherein drive and output electronics is adapted to read out said signal data in digitized form in real time between pulses from said light source.

19. The sensor for detecting the presence of light of claim 16 wherein said amplification means comprises a microchannel plate.

20. The sensor for detecting the presence of light of claim 16 wherein said amplification means operates by electron impact on the collection and detection means.

21. The sensor for detecting the presence of light of claim 16 wherein said amplification means comprises a Digicon.

22. The sensor for detecting the presence of light of claim 16 wherein said collecting or detecting means comprises anodes.

23. The sensor for detecting the presence of light of claim 16 wherein said collecting or detecting means comprises PIN diodes.

24. The sensor for detecting the presence of light of claim 16 wherein said analog processing readout chip comprises a delta reset circuit for enhanced signal to noise ratio.

25. The sensor for detecting the presence of light of claim 16 wherein said collecting or detecting means comprises an array of PIN diodes which are electrically and individually connected to said readout electronics on said analog-processing readout chip by metal bumps, to form a hybrid.

26. The sensor for detecting the presence of light of claim 16 wherein said readout electronics incorporates a shift register to sequence between said storage capacitors.

27. The sensor for detecting the presence of light of claim 16 wherein said readout electronics uses the direct readout approach with a source follower for each unit cell.

28. The sensor for detecting the presence of light of claim 16 wherein said analog-processing readout chip uses a current driver to drive the data signals off the chip.

29. The sensor for detecting the presence of light of claim 16 wherein said analog-processing readout chip uses an integration time interval less than 20 ns.

30. The sensor for detecting the presence of light of claim 16 wherein said analog-processing readout chip uses a reset time less than about 10 ns.

31. The sensor for detecting the presence of light of claim 16 wherein said analog-processing readout chip uses bulk silicon CMOS processing.

32. The sensor for detecting the presence of light of claim 16 wherein said analog-processing readout chip uses silicon on sapphire CMOS processing.

33. The device for imaging sections of a three dimensional object immersed in a light conducting medium of claim 1 wherein said sensor means is a plurality of sensors optically connected by optic fibers to the focal plane of said optics.

34. The sensor of claim 16 wherein said sensor is comprised of a plurality of sensors optically connected by optic fibers to an optical focal plane.

35. The device for imaging sections of a three dimensional object immersed in a light conducting medium of claim 1 wherein said sensor means is a plurality of sensors have differing optical paths, wherein depth resolution is increased.

36. The sensor for detecting the presence of light of claim 16 wherein said sensor is a plurality of sensors of differing optical paths wherein depth resolution is increased.

37. A method for for imaging sections of a three dimensional object immersed in a light conducting medium comprising the steps of generating a series of pulses of light, transmitting said pulses of light into said medium, collecting light from said medium during a sequence of time intervals between the transmission of successive pulses from said light source, detecting said collected light, providing an electrical signal corresponding to said amplified light, sequentially storing said electrical signal on a separate plurality of unit cells during each of said time intervals, providing signals from said storage means, converting the signals stored on said storage means from analogue to digital signals.

38. The method for imaging sections of an object of claim 37 further comprising the steps of increasing depth resolution by physically changing the optical path length between the light-source transmitter, transmission medium or object, and receiver in the time between light source pulses.

39. The method for imaging sections of an object of claim 37 wherein depth resolution is increased by electronically changing the relative timing between initiation of a laser pulse and said time interval or storage capacitor reset time or switching time, between laser pulses.

40. The method for imaging sections of an object of claim 37 wherein depth resolution is increased by multiple sensors positioned so the difference in their optical path length corresponds to the depth resolution, for integration times and laser pulse lengths which normally correspond to poorer depth resolution.

* * * * *